United States Patent [19]
Kai

[11] Patent Number: 5,655,158
[45] Date of Patent: Aug. 5, 1997

[54] BLURRING MOTION DETECTION DEVICE

[75] Inventor: Tadao Kai, Kawasaki, Japan

[73] Assignee: Nikon Corporation, Tokyo, Japan

[21] Appl. No.: 707,372

[22] Filed: Sep. 5, 1996

[30] Foreign Application Priority Data

Sep. 6, 1995 [JP] Japan .................... 7-228901

[51] Int. Cl.$^6$ .................... G03B 17/00
[52] U.S. Cl. .................... 396/55; 348/208
[58] Field of Search .................... 396/53, 54, 55; 348/208

[56] References Cited

U.S. PATENT DOCUMENTS

| | | | |
|---|---|---|---|
| 5,012,270 | 4/1991 | Sekine et al. | 396/54 |
| 5,041,852 | 8/1991 | Misawa et al. | 354/76 |
| 5,267,034 | 11/1993 | Miyatake et al. | 396/55 |
| 5,282,044 | 1/1994 | Misawa et al. | 396/55 |
| 5,309,190 | 5/1994 | Shinohara et al. | 396/55 |
| 5,386,264 | 1/1995 | Sekine et al. | 396/55 |
| 5,561,498 | 10/1996 | Sekine et al. | 396/53 |

*Primary Examiner*—Russell E. Adams

[57] ABSTRACT

A blurring motion detection device and method to determine an improved blurring motion zero reference value. The device includes a storage unit to store averaged blurring motion data based on an average of successive blurring motion data, with new blurring motion data being more recent in time than old blurring motion data. A selection unit filters out anomalous blurring motion data by selecting the blurring motion data within a deviation range from an average of the stored blurring motion data. The deviation range may include a first deviation range for the old blurring data which is set to be smaller than a second deviation range for the new blurring motion data. The deviation range may also be defined by a decision function which gradually widens the deviation range for the new blurring motion data. A calculation unit calculates the blurring motion zero reference value based on the blurring motion data within the deviation range. The calculation of the average of the successive blurring motion data and the blurring motion zero reference value may use weighted blurring motion data in which the new blurring motion data has a greater weight than the old blurring motion data.

21 Claims, 5 Drawing Sheets

BLURRING MOTION DETECTION DEVICE

BACKGROUND OF THE INVENTION

1. Field of the Invention

This invention is related to blur detection. More specifically, the present invention is related to a blurring motion detection device to detect blurring motions, such as from hand movements, on a camera and the like.

2. Description of the Related Art

Detection of blurring motion acting on a camera and compensation for image blur based on the detected blurring motion is well known in the industry. Methods well known in the industry are also used to increase the output accuracy of blur detection sensors as a type of drift countermeasure. An example of such methods includes Japanese Laid-Open Patent Publication number JP-A-4-211230, in which the average value of output values of the blurring motion detection sensors is calculated in a predetermined time. The average value is taken as a standard value (a blurring motion zero reference value) of the output of the blurring motion detection sensor.

However, the following problems existed in the aforementioned conventional technology.

When an average value is to be calculated from the output of a blurring motion detection sensor, the data to be collected to calculate the average value should preferable be free from irregular blurring motions acting on the camera. However, in photography of a stationary subject, photographic preparations may include changing the photographic field angle after framing is performed during manipulation of the composition of the photograph. Such movement of the camera may occur particularly in autofocus (AF) cameras after focusing is performed on the main subject to reframe the desired composition of the photograph where the main subject is no longer in the picture center. An output value of a blurring motion detection sensor during such movement of the camera will reflect an undesirably large offset or alteration movement. Accordingly, if the output value during such movement is used in calculating the average value, a standard value of high reliability cannot be obtained.

Moreover, if the data collected from the blur detection sensor for use in determining an average value becomes too old (i.e., data from a time in the past that is distant from the time of photography), then the data collected will not reflect conditions near the time photographic preparations end. Thus, when using such old data to calculate an average value, the true standard value at the time of photography cannot be obtained and a displacement occurs.

In addition, because the amount of movement during a panning motion is different from the amount of movement occurring at the commencement of the panning motion, a blurring motion zero reference value calculated from data collected during the panning motion commencement and panning motion execution is disadvantageous.

SUMMARY OF THE INVENTION

Accordingly, it is an object of the present invention to calculate a more accurate and reliable blurring motion zero reference value in blurring motion detection.

It is a further object of the present invention to achieve a more efficient processing load on the blurring motion detection device of the present invention.

It is yet another object of the present invention to filter out anomalous blurring motion data in determining the blurring motion zero reference value.

It is a further object of the present invention to calculate a more accurate and reliable blurring motion zero reference value with a blurring motion detection device of simple construction.

Objects of the present invention are achieved by providing a blurring motion detection device and method to determine an improved blurring motion zero reference value. The device includes a storage unit to store averaged blurring motion data based on an average of successive blurring motion data, with new blurring motion data being more recent in time than old blurring motion data. The average of the successive blurring motion data may be calculated from weighted blurring motion data in which the new blurring motion data has a greater weight than the old blurring motion data. A selection unit filters out anomalous blurring motion data by selecting the blurring motion data within a deviation range from an average of the blurring motion data.

Objects of the present invention are also achieved by providing a blurring motion detection device using a first deviation range for old blurring motion data and a second deviation range for new blurring motion data. The second deviation range is set to be larger than the first deviation range. The deviation range may also be defined by a decision function which gradually widens the deviation range for the new blurring motion data.

Objects of the present invention are further achieved by providing blurring motion detection device having a calculation unit to calculate the blurring motion zero reference value based on the blurring motion data within the deviation range. The calculation of the blurring motion zero reference value may also use weighted blurring motion data in which the new blurring motion data has a greater weight than the old blurring motion data.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
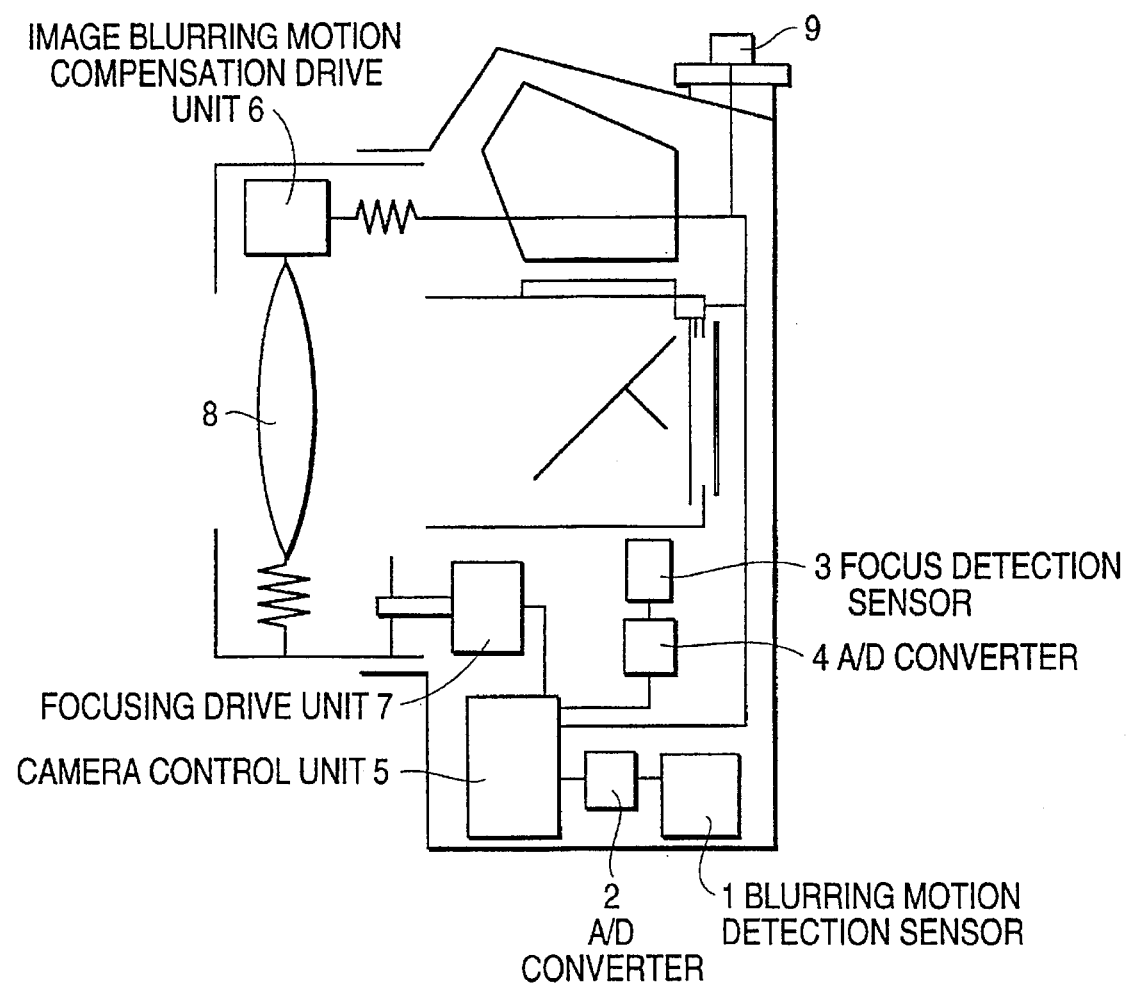
FIG. 1 is a diagram showing a preferred embodiment of a blurring motion detection device of the present invention incorporated in a camera.

Reference will now be made in detail to the present preferred embodiments of the present invention, examples of which are illustrated in the accompanying drawings, wherein like reference numerals refer to like elements throughout.

Figure 2:
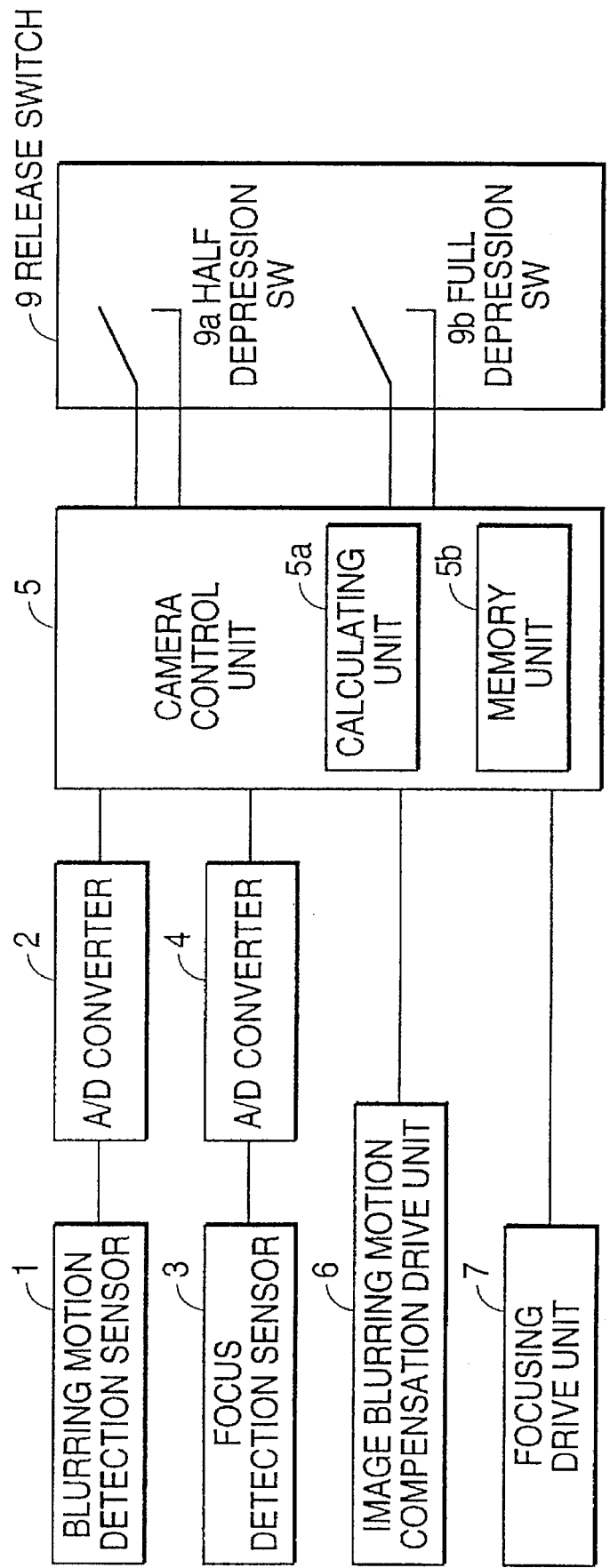
FIG. 2 is a block diagram of the components of the preferred embodiment of the present invention depicted in FIG. 1.

FIG. 1 shows a preferred embodiment of a blurring motion detection device according to the present invention incorporated within a camera. FIG. 2 is a block diagram showing the relationship and connections between components of the camera depicted in FIG. 1.

The blurring motion detection sensor 1 is a sensor that detects hand movements and similar blurring motions acting on the camera. The blurring motion detection sensor 1 outputs analog data corresponding to the angular velocity of the blurring motion of the camera. An example of the blurring motion detection sensor 1 includes, but is not limited to, a piezoelectric vibration gyro angular velocity sensor.

An A/D converter 2 converts the analog data outputted from the blurring motion detection sensor 1 to digital data. A dedicated IC may be used as the A/D converter 2, but one such as the A/D port of a microcomputer constituting the camera control unit 5 (described below) may also be used.

A focus detection sensor 3 detects the imaging state of the photographic optical system. The focus detection sensor 3 outputs analog data of picture signals (video signals) from a CCD solid state imaging circuit. An example of a focus detection sensor 3 includes, but is not limited to, a divided pupil type of TTL focus detection sensor.

An A/D converter 4 converts the analog data outputted from the focus detection sensor 3 to digital data. As with the A/D converter 2, the A/D port of a microcomputer may be employed as the A/D converter 4. Alternatively, the A/D converter 2 may also be employed as the A/D converter 4 when the A/D converter 2 is used in a time sharing mode in a multiplexer circuit.

The camera control unit 5 may be a microcomputer and the like for controlling the operations of the whole camera. The camera control unit 5 has a calculating unit 5a and a memory unit 5b. The calculating unit 5a calculates digital data. The memory unit 5b stores digital data. An example of the calculating unit 5a includes, but is not limited to, the CPU circuit of a microcomputer employed as the camera control unit 5. An example of the memory unit 5b includes, but is not limited to, RAM, EEPROM, or flash memory circuits built into or external to the microcomputer.

In the present preferred embodiment, the photographic optical system 8 is a blurring motion compensation optical system. A drive method of the photographic optical system 8 includes, but is not limited to, (1) a method of causing the photographic optical system 8 to move by the rotation of a feed screw by means of a rotary motor, (2) a method of causing linear motion by means of a voice coil and a magnetoelectric circuit, and (3) a method of shift driving which uses a linear motor and the like. This preferred embodiment adopts a method which shifts the whole optical system and the blurring motion compensation drive unit 6 shift drives the photographic optical system 8 to effect blurring motion compensation. In FIG. 1, only a shift in the vertical direction of the camera (Y direction) is shown, but driving may also be performed in the camera's horizontal direction (X axis).

In addition, blurring motion compensation may further include other methods to cause the driving of the photographic optical system 8 or a portion of the optical system. Such further methods may include, for example, (1) use of a variable angle prism, (2) shifting an imaging unit (e.g., photographic film), and (3) adjusting the mounting angle of a reflecting mirror located in the photographic optical path.

The focusing drive unit 7 moves the photographic optical system 8 in the optical axis direction to effect focusing on the imaging surface. In the present preferred embodiment, the whole photographic optical system 8 is caused to move during focusing by the focusing drive unit 7, but movement of only a portion of the optical system is also possible.

The release switch 9 includes a half depression switch 9a and a full depression switch 9b. The release switch 9 is electrically connected to the camera control unit 5. When the release switch 9 is set ON/OFF, a signal is transmitted to the camera control unit 5.

Figure 3:
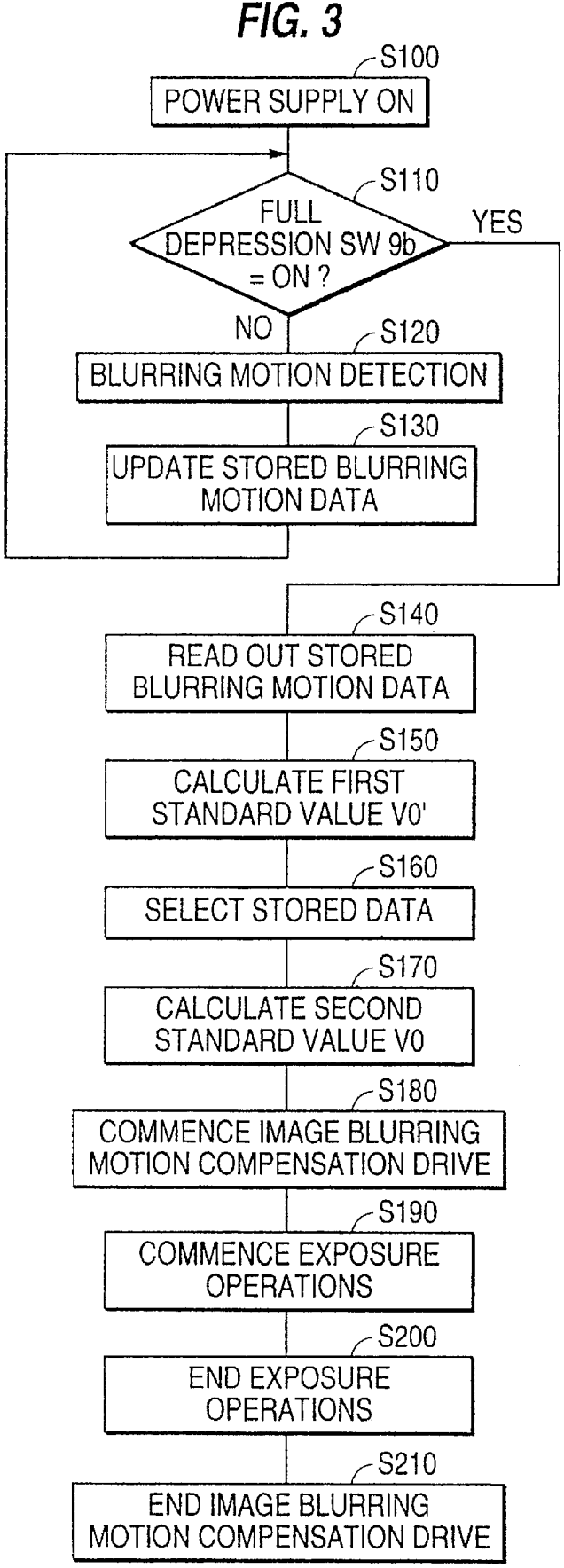
FIG. 3 is a flow chart illustrating the operation of the camera of FIG. 1.

FIG. 3 is a flow chart illustrating an operation of the camera of FIG. 1. This camera has a so-called one-shot AF mode in which the exposure does not commence if the photographic optical system 8 does not focus. In the following description of FIG. 3, the processing at each step is performed by the camera control unit 5 unless otherwise stated.

The flow chart of FIG. 3 starts at step S100 in which the half depression switch 9a becomes ON, the camera power supply becomes ON, etc. In S110, the full depression switch 9b is checked for being ON. If the full depression switch 9b is not ON, processing proceeds to step S120. If the full depression switch 9b is ON, processing proceeds to step S140.

In step S120, the data of the blurring motion detection sensor 1, obtained through the A/D converter 2, is read out. In step S130, the data obtained in step S120 is stored in the memory unit 5. Successively obtained data is stored until the storage capacity of the memory unit 5 is reached. On reaching the memory capacity limit (for example, NL data), the oldest data is erased, and is replaced by the newest data.

To effect savings in the memory capacity of the memory unit 5b, the successively obtained data may be modified for storage between steps S120 and S130. For example, if 8 items of data are temporarily stored, an average of the data may be calculated by the calculating unit 5a and this single average value may be stored in the memory unit 5b instead of eight data values. If blurring motion data is inputted each 1 msec, the average value of 8 items of data may be stored. The stored average value would represent 8 msec of data. Because the frequency of hand movements on the camera is at a comparatively low frequency, sampling of the data may be at about 8 to 16 msec intervals of time. Accordingly, an average value of 8 data values sampled at 8 to 16 msec intervals may be calculated and stored. Such an average value would represent 64–128 msec of data. Moreover, the average may be of 16 or 32 items of data, not just of 8 items. Thus, this compressed form of data storage allows data over a longer period of time to be stored in a comparatively smaller amount of memory capacity.

When the full depression switch 9b is on, processing proceeds to step S140. Step S140 and the steps following step S140 are related to an exposure operation.

Figure 4:
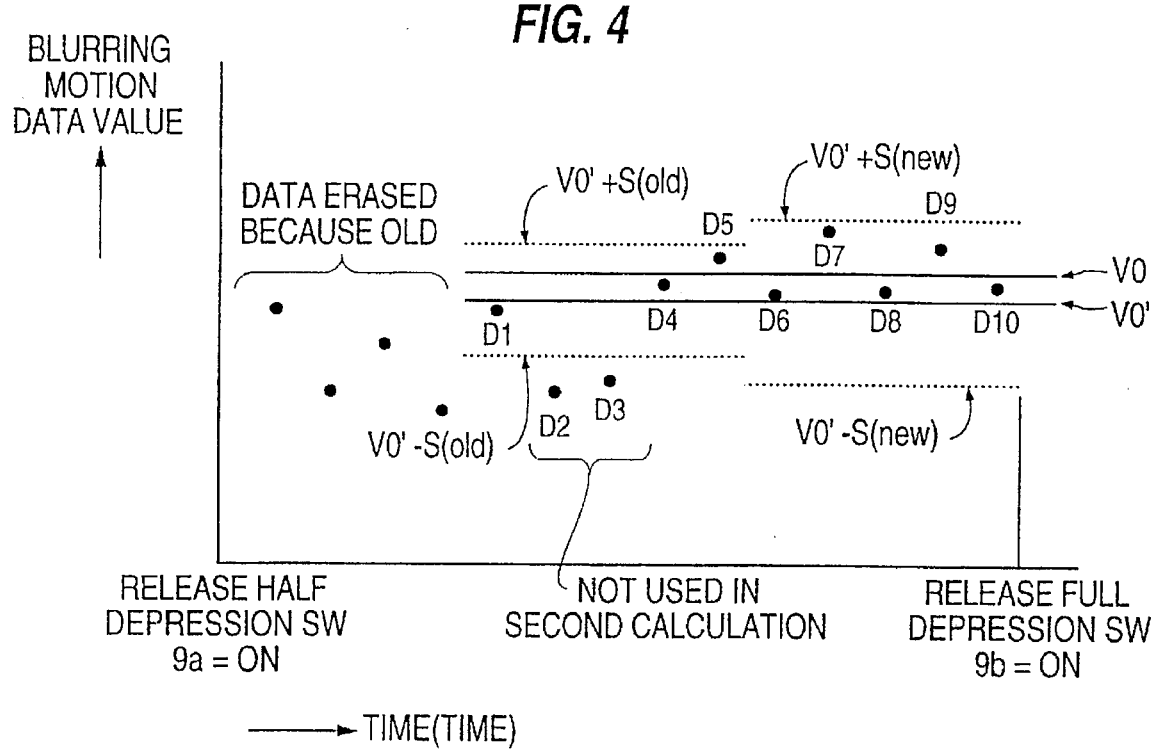
FIG. 4 is a graph illustrating a sample data distribution, deviation ranges, and standard values.

In step S140, the camera blurring motion data which had been stored in the memory unit 5b are read out. Then, in the next step S150, a first calculation is performed by the calculating unit 5a based on the data which were read out in step S140. FIG. 4 illustrates the data stored in the memory unit 5b which is read out. In FIG. 4, the number of data stored in the memory unit 5b is the 10 newest items (D1–D10, D10 being the newest), and old data previous to this is erased. The first calculation of step S150 performs a calculation of an overall average or an arithmetic mean of all the data D1–D10. The value obtained here becomes the first standard value V0'.

Next, in step S160, the calculating unit 5a compares the first standard value V0' found in step S150 with each data Dn. This comparison determines whether a particular data Dn should be used in a second calculation for an improved standard value or a blurring motion zero reference value. The objective in deciding whether to use a particular data Dn is to remove any data Dn which is anomalous with respect to the first standard value V0'.

By such determinations, data Dn which deviates to a certain extent from the standard value V0' will not be used in the second calculation. The exclusion of selected data Dn addresses the problem that certain data may reflect blurring motion data that is significantly different from the blurring motion data near the time of photography. "New" data Dn generated near the end of photographic preparations (e.g., D6–D10) are less prone to reflect anomalous blurring motions. But, there is a high possibility that "old" data (e.g., D1–D5), reflecting blurring motion more distant in time from the photographic preparation end state, would include unwanted blurring motion associated with the photographer's reframing of the camera or other picture composition manipulations. Instead of haphazard discarding of old data from the second calculation (which may lead to decreased reliability of the resulting standard value), the selection process for the second calculation according to the present invention identifies only the useful data Dn and bolsters the reliability and accuracy of the standard value calculated by the second calculation.

First, the absolute value of the deviation of each data Dn from the standard value V0' is calculated. The absolute value results R1–R10 are then compared with decision values S(old) and S(new), discussed in further detail below. Absolute value deviations R1–R5 are compared with decision value S(old). Absolute value deviations R6–R10 are compared with decision value S(new). Data Dn having an Rn>S(old) (for n=1–5) or Rn>S(new) (for n=6–10) are not used in the second calculation for the improved standard value V0 or blurring motion zero reference value. Expressed in another way, data Dn retained for the second calculation for n=1–5 must fall within a first deviation range of (V0'−S(old)) $\leq$ Dn $\leq$ (V0'+S(old)). Data Dn retained for the second calculation for n=6–10 must fall within a second deviation range of (V0'−S(new)) $\leq$ Dn $\leq$ (V0'+S(new)). Data Dn not present in these ranges are not used.

The decision values are either S(old) $\leq$ S(new), or S(old) <S(new). This relationship reflects the expectation that the old data are more likely to incorporate anomalous data than the new data, as discussed above. The decision values S(old) and S(new) may be predetermined values placed in the memory unit 5b at the time of manufacture of the camera— the predetermined values being found by previous experiment. The memory unit 5b which stores these decision values may be non-volatile, such as mask ROM or EEPROM.

The decision values S(old) and S(new) may also be determined by predetermined relationships with the data D1–D10 or the deviations R1–R10. For example, the maximum value of the deviations R1–R10×($\frac{1}{2}$) may be taken as the decision value S(old), and the maximum value of the deviations R1–R10×($\frac{3}{4}$) may be taken as the decision value S(new).

Moreover, the decision values S(old) and S(new) may be calculated each time R1–R10 is calculated. For example, among values on both sides, the method is to use the smaller value or the larger value.

Of course, the present invention is not limited to using 10 data items for determining the blurring motion standard value—other quantities of data items may be used. Moreover, a limitation may be established as to the number of data items that may be removed from the second calculation. For example, a limitation may be used for excluding only up to a maximum of 3 data items that are compared to S(old). Another limitation may be used for excluding only up to a maximum of 2 data items that are compared to S(new). Again, this allowance for removing more old data than new data reflects the expectation that the old data are more likely to incorporate anomalous data than the new data, as discussed above.

In step S170, the calculation unit 5a calculates the average (arithmetic mean) using the data items which were retained in step S160. In the example of FIG. 4, among the data D1–D10, the average is calculated using data other than D2 and D3. This average becomes the second standard value V0 or the blurring motion zero reference value.

In step S180, drive control signals are output to the image blurring motion compensation drive unit 6, causing image blurring motion compensation driving to commence. Similar to step S120, data (VS) from the blurring motion detection sensor 1 is obtained through the serial A/D converter 2. The true blurring motion data of the camera is calculated by the calculating unit 5a from the difference between VS and the blurring motion zero reference value (standard value V0) obtained in step S170 (i.e., VS−V0). Calculation of an appropriate compensation drive amount by the calculating unit 5a is based on this true blurring motion data (VS−V0). A drive control signal of the image blurring motion compensation is output by the camera control unit 5 to the image blurring motion compensation drive unit 6. Image blurring motion compensation driving continues until processing reaches step S210.

Continuing in step S190, a drive control signal is output to the shutter unit (not shown in the drawing) of the camera, causing the exposure operation to commence. In step S200, when the exposure time, a predetermined time commenced by step S190, has elapsed, a signal is output to the shutter unit to end the exposure operation. Next, in step S210, a signal is output from the camera control unit 5 to the image blurring motion compensation drive compensation unit 6 to end image blurring motion compensation driving.

The present invention is not limited to the blurring motion detection device of the above embodiment. For example, the method of setting the deviation ranges and calculating the standard values may be effectively changed and modified in the further preferred embodiments described below.

A second preferred embodiment of the blurring motion detection device of the present invention, in comparison with the first preferred embodiment, only differs in the selection method of the data Dn in order to calculate the blurring motion zero reference value (standard value V0).

In the first preferred embodiment, the decision values S(old) and S(new) were used. In this second preferred embodiment, a decision function fS(n) is used to set a varying deviation range used in filtering out anomalous data items. The varying deviation range set by the decision function fS(n) varies gradually and favors the new blurring motion data items by widening the deviation range for newer blurring motion data. The decision function fS(n) includes, for example:

$$fS1(n)=S(c)\times\alpha^{(n-1)}; \text{ constants: } S(c)>0, \alpha>1; \quad (1)$$

$$fS2(n)=S(c)+(\beta\times(n-1)); \text{ constants: } S(c)>0, \beta\geq 0; \text{ and} \quad (2)$$

$$fS3(n)=S(c)+(\delta\times\gamma^{(n-1)}); \text{ constants: } S(c)>0, \delta\geq 0, \gamma>0. \quad (3)$$

Figure 5:
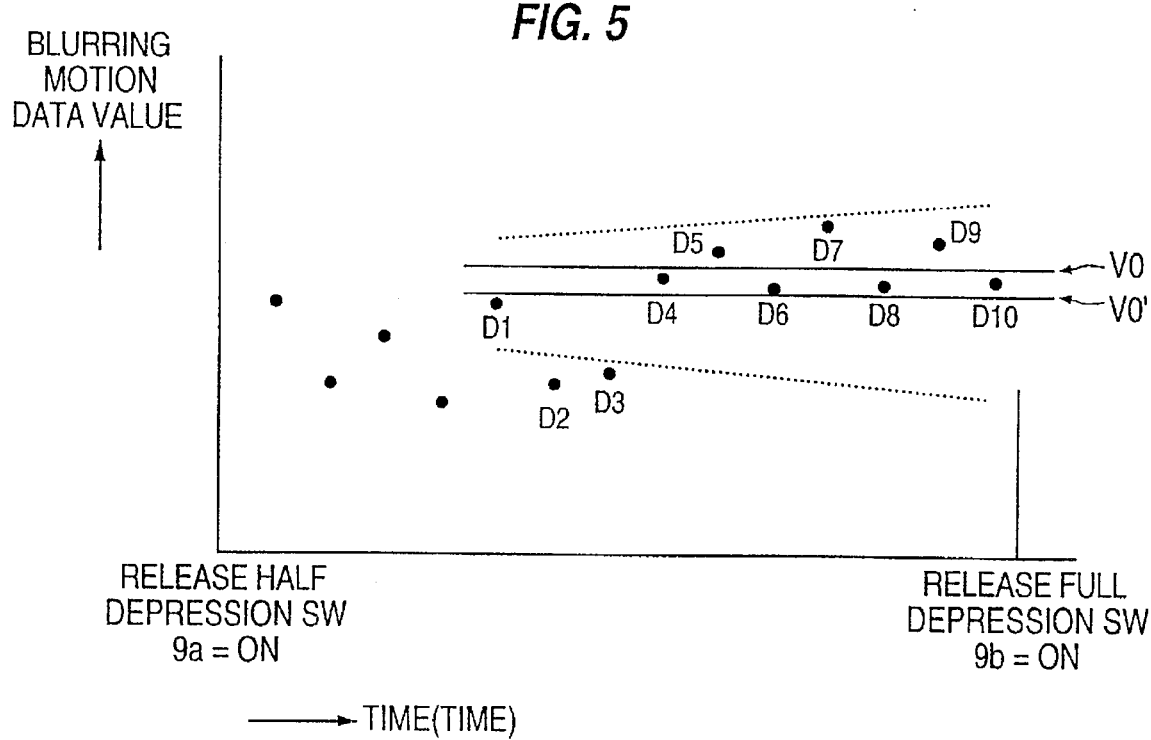
FIG. 5 is a graph illustrating a sample data distribution, standard values, and a deviation range according to a second preferred embodiment of the present invention.

FIG. 5 is a graph illustrating a sample data distribution, standard values, and a deviation range according to this second preferred embodiment of the present invention. The absolute value deviation $R_n$ corresponding to each $D_n$ is used in the decision functions $fS1(n)$, $fS2(n)$, or $fS3(n)$, etc., to select the data $D_n$ in step S160 to be used in the second calculation of step S170. As shown by the dotted lines in FIG. 5, the decision function $fS(n)$ allows for an increasingly wider deviation range for newer data $D_n$ to be selected for the second calculation. The dotted lines shown in the example of FIG. 5 approximates the difference function $fS2(n)$ above. Accordingly, FIG. 5 shows that data $D2$ and $D3$ will be removed from the data which is used in the second calculation.

In a third preferred embodiment of the blurring motion detection device of the present invention, the calculation of the first standard value $V0'$ and the second standard value $V0$ in steps S150 to S170 does not use the average or arithmetic mean of the data. In this third preferred embodiment, the calculation of the first standard value is performed as follows:

$$V0'=((D1 \times C1)+(D2 \times C2)+ \ldots +(D10 \times C10))/(C1+C2+ \ldots +C10);$$

$C1-C10$: positive constants ($C1 \leq C2 \leq \ldots \leq C10$).

This calculation is an example of performing a weighted average calculation in which the newer the data is assigned a greater weight than the older data. A greater weight is accorded to the newer data because the newer data is closer to the time of photography. The constants $C1$ to $C10$ do not all have to be different values; the values may increase stepwise. The constants $C_n$ may also be equal to each other, but $C1$ cannot be equal to $C10$.

Figure 6:
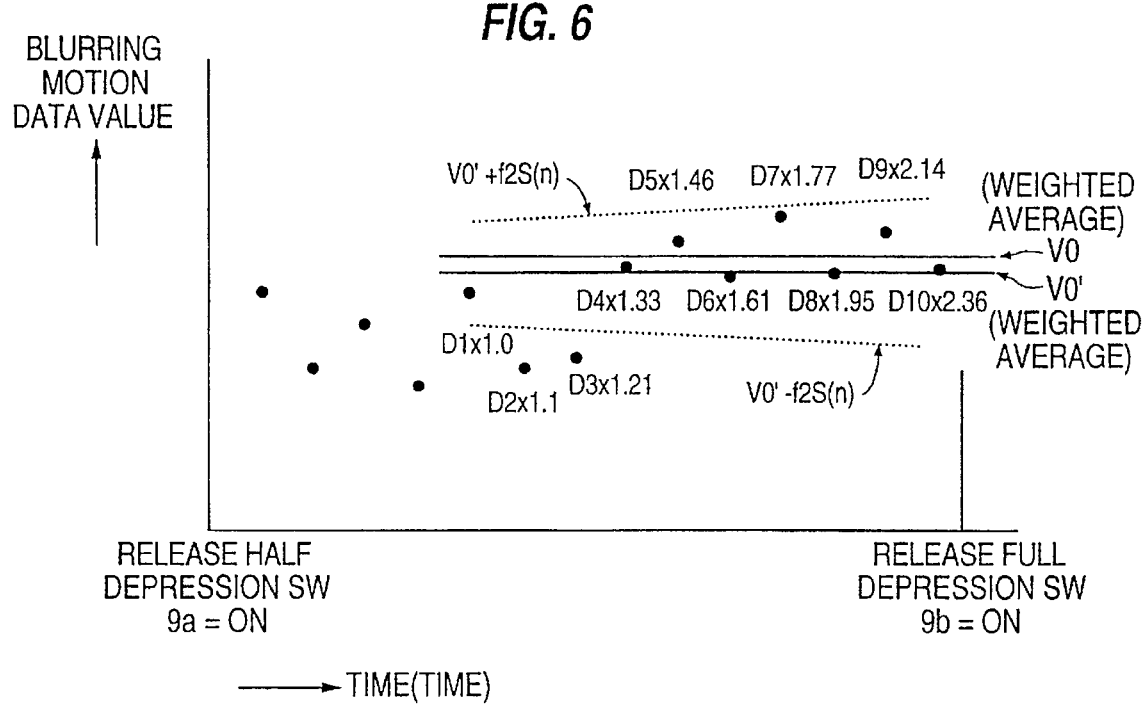
FIG. 6 is a graph illustrating a sample data distribution, a deviation range, and standard values according to a third preferred embodiment of the present invention.

In an example of this third embodiment shown in FIG. 6, the first standard value $V0'$ is calculated with a weighted function having the constant $C_n=1.1^{(n-1)}$. The data $D_n$ in FIG. 6 are depicted with their respective weights. The decision function $f2S(n)$ (similar to the decision functions of the second preferred embodiment) is a function which changes gradually over time, allowing for an increasingly wider deviation range for newer data $D_n$ to be selected for the second calculation. Data $D_n$ to be selected for the second calculation must fall within the deviation range of $(V0'-f2S(n)) \leq D_n \leq (V0'-f2S(n))$. The blurring motion zero reference value (the second standard value $V0$) is also calculated using a weighted average, similar to the weighted calculation of the first standard value $V0'$.

A fourth preferred embodiment of the present invention will now be described.

Figure 7:
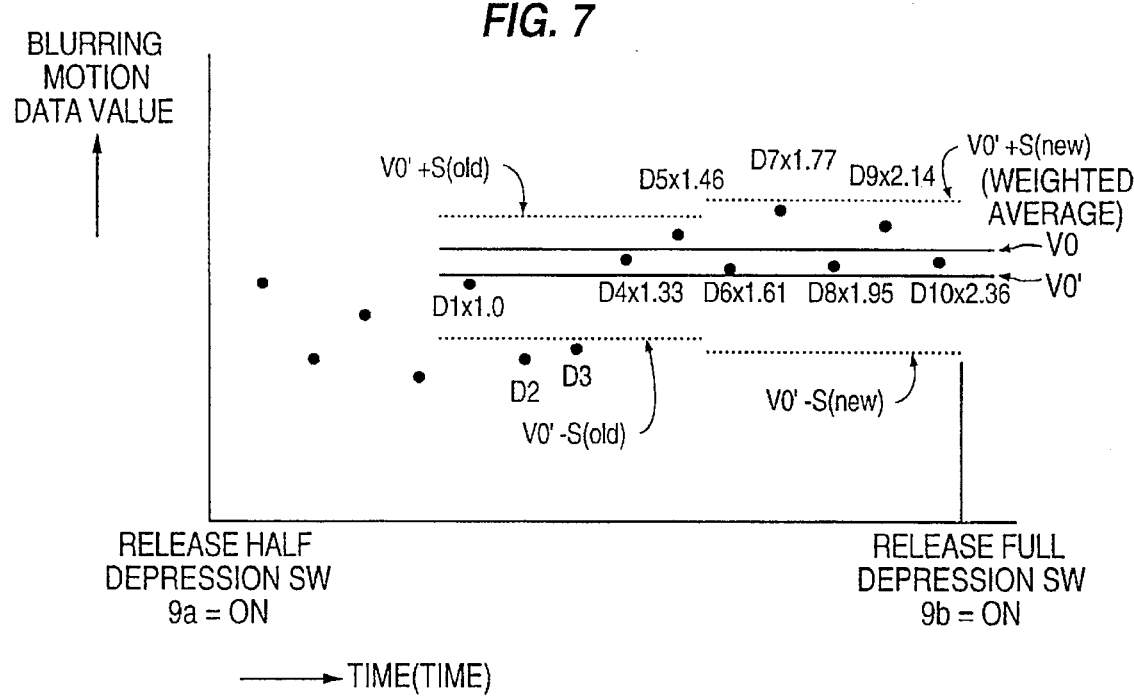
FIG. 7 is a graph illustrating a sample data distribution, deviation ranges, and standard values according to a fourth preferred embodiment of the present invention.

FIG. 7 is a graph illustrating a sample data distribution, deviation ranges, and standard values according to a fourth preferred embodiment of the present invention. In the example of FIG. 7, the first standard value $V0'$ is calculated in step S150 by an arithmetic mean. For step S170, the second standard value $V0$ is calculated using a weighted function similar to the third preferred embodiment having a constant $C_n=1.1^{(n-1)}$. The respective weights for each data $D_n$ are also depicted in FIG. 7. Of course, this type of weighted average calculation may also be performed in step S150 to calculate the first standard value $V0'$ instead of using an arithmatic mean.

In this fourth preferred embodiment, decision values $S(old)$ and $S(new)$ are used in step S160 to select the appropriate data $D_n$. But, since the second calculated standard value $V0$ will reflect the weighted importance of the newer data, the setting of the decision values $S(old)$ and $S(new)$ will not need to reflect the importance of the newer data as much as in the first preferred embodiment. Thus, the difference between the decision values $S(old)$ and $S(new)$ used in the data selection in step S160 may be small. Alternatively, the decision values $S(old)$ and $S(new)$ may be set to be equal.

In the above embodiments, the blurring motion detection sensor I may be a piezoelectric vibration gyro. Thus, the data $D_n$ of FIGS. 4–7 reflect the dimensions of angular velocity outputs from the gyro. The data $D4$ and thereafter in FIGS. 4–7 show a center of distribution displaced upwards. Such a displacement may result from a panning motion and the data may reflect a fixed angular velocity superposed on hand blurring movements. Nevertheless, because panning was effected at a fixed angular velocity, the second standard value $V0$ is desirably set to be the average angular velocity of the panning velocity.

Moreover, in the above embodiments, the blurring motion detection sensor 1 may be an angular displacement sensor or like detection means. Thus, the data $D_n$ of FIGS. 4–7 reflect the dimensions of angular displacement outputs. In the case of an angular displacement sensor, the upwards displacement of the center of the data distribution, $D4$ and thereafter, may reflect a case in which the photographic field angle changed due to framing before photography. Nevertheless, because the blurring motion was changed at a constant angle even at the time of photography, the standard value desirably becomes the second standard value $V0$, which is the averaged angular value after the field angle change.

With the blurring motion detection device according to the present invention, higher accuracy in blurring motion drive control may be achieved with a more efficient processing load on the camera control unit 5. The blurring motion data reflecting blurring motion near the time of photography is successively retrieved, averaged, and stored, as discussed above for steps S110 to S130. Such successively averaged data reduces the overall processing requirements on the camera control unit 5 according to the present invention.

When the full depression switch is depressed, anomalous blurring motion data is effectively filtered out from a calculation of a blurring motion zero reference value (an improved standard value $V0$), as discussed above for steps S140 to S170. This selection of appropriate data items in the calculation of an improved standard value overcomes the problems of the previously mentioned conventional art. The blurring motion detection device according to the present invention avoids the use of unwanted anomalous data reflective of blurring motion deviating too much from the blurring motion near the end of photographic preparations or near the time of photography.

Several variations were also described with respect to the method of calculating an improved standard value. A decision function $fS(n)$ may be used instead of decision values $S(old)$ and $S(new)$. A weighted standard value may also be calculated. These variations also improve the accuracy and reliability of the blurring motion zero reference value determined by the blurring motion detection device of the present invention.

A true blurring motion value is also easily determined from $VS-V0$, as discussed above for step S180. Thus, the amount of calculation accompanying blurring motion compensation control during exposure can be reduced and the processing load on the camera control unit 5 can be small. Having efficient processing duties placed on the camera control unit 5 also results in reduced consumption of electric power, allowing for reduction in size and cost for the camera.

It should be understood that the blurring motion detection device according to the present invention is particularly suitable for a camera and that the term camera is not used in a narrow sense but can include different types of camera devices, such as still cameras, video cameras, and the like. Moreover, although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A blurring motion detection device, comprising:
   a storage unit to store blurring motion data with new blurring motion data being more recent in time than old blurring motion data; and
   a selection unit to filter out anomalous blurring motion data by selecting the blurring motion data within a deviation range from an average of the blurring motion data, the deviation range being set larger for the new blurring motion data than for the old blurring motion data.

2. A device as recited in claim 1, wherein said storage device stores averaged blurring motion data based on an average of successive blurring motion data.

3. A device as recited in claim 1, wherein the deviation range comprises:
   a first deviation range used for the old blurring motion data; and
   a second deviation range used for the new blurring motion data, said second deviation range being larger than said first deviation range.

4. A device as recited in claim 1, wherein the deviation range is defined by a decision function which gradually widens the deviation range for the new blurring motion data.

5. A device as recited in claim 1, wherein the average of the blurring motion data is a weighted average based on the new blurring motion data having a greater weight than the old blurring motion data.

6. A device as recited in claim 1, further comprising:
   a calculation unit to calculate a blurring motion zero reference value based on the blurring motion data within the deviation range.

7. A device as recited in claim 6, wherein the blurring motion zero reference value is a weighted average based on the new blurring motion data having a greater weight than the old blurring motion data.

8. A blurring motion detection device, comprising:
   a storage unit to store blurring motion data with new blurring motion data being more recent in time than old blurring motion data;
   a selection unit to filter out anomalous blurring motion data by selecting the blurring motion data within a deviation range from an average of the blurring motion data, the deviation range being set larger for the new blurring motion data than for the old blurring motion data; and
   a calculation unit to calculate a blurring motion zero reference value based on the blurring motion data within the deviation range.

9. A device as recited in claim 8, wherein said storage device stores averaged blurring motion data based on an average of successive blurring motion data.

10. A device as recited in claim 8, wherein the deviation range comprises:
    a first deviation range used for the old blurring motion data; and
    a second deviation range used for the new blurring motion data, said second deviation range being larger than said first deviation range.

11. A device as recited in claim 8, wherein the deviation range is defined by a decision function which gradually widens the deviation range for the new blurring motion data.

12. A device as recited in claim 8, wherein the average of the blurring motion data is a weighted average based on the new blurring motion data having a greater weight than the old blurring motion data.

13. A device as recited in claim 8, wherein the blurring motion zero reference value is a weighted average based on the new blurring motion data having a greater weight than the old blurring motion data.

14. A camera, comprising:
    a storage unit to store blurring motion data with new blurring motion data being closer in time to a photography operation than old blurring motion data;
    a selection unit to filter out anomalous blurring motion data by selecting the blurring motion data within a deviation range from an average of the blurring motion data, the deviation range being set larger for the new blurring motion data than for the old blurring motion data; and
    a calculation unit to calculate a blurring motion zero reference value based on the blurring motion data within the deviation range.

15. A method to generate a blurring motion zero reference value in a camera, comprising the steps of:
    storing blurring motion data with new blurring motion data being closer in time to a photography operation than old blurring motion data;
    averaging the blurring motion data;
    setting a deviation range from the averaged blurring motion data of said step of averaging, the deviation range being larger for the new blurring motion data than for the old blurring motion data; and,
    calculating the blurring motion zero reference value based on the blurring motion data within the deviation range.

16. A method as recited in claim 15, wherein said step of storing stores averaged blurring motion data based on an average of successive blurring motion data.

17. A method as recited in claim 15, wherein said step of setting sets a first deviation range used for the old blurring motion data to be smaller than or equal to a second deviation range used for the new blurring motion data.

18. A method as recited in claim 15, wherein said step of setting sets the deviation range based on a decision function which gradually widens the deviation range for the new blurring motion data.

19. A method as recited in claim 15, wherein said step of averaging uses weighted blurring motion data, the new blurring motion data having a greater weight than the old blurring motion data.

20. A method as recited in claim 15, wherein said step of calculating calculates the blurring motion zero reference value using weighted blurring motion data, the new blurring motion data having a greater weight than the old blurring motion data.

21. A method to generate a blurring motion zero reference value in a camera, comprising the steps of:
    setting a deviation range from an arithmetic mean or an average of blurring motion data, the blurring motion data having new blurring motion data being closer in time to a photography operation than old blurring motion data, the deviation range being larger for the new blurring motion data than for the old blurring motion data; and,
    calculating the blurring motion zero reference value based on the blurring motion data within the deviation range.

* * * * *